United States Patent
Fujita

[11] Patent Number: 5,845,117
[45] Date of Patent: Dec. 1, 1998

[54] DEADLOCK DETECTING DEVICE

[75] Inventor: Kazuhiko Fujita, Kawasaki, Japan

[73] Assignee: Fujitsu Limited, Kawasaki, Japan

[21] Appl. No.: 719,919

[22] Filed: Sep. 25, 1996

Related U.S. Application Data

[63] Continuation of Ser. No. 204,506, Mar. 2, 1994, abandoned.

[30] Foreign Application Priority Data

Mar. 19, 1993 [JP] Japan ..................... 5-096928

[51] Int. Cl.$^6$ ........................................ G06F 9/46
[52] U.S. Cl. .................. 395/677; 364/281.5; 364/230.3; 395/674
[58] Field of Search ............................. 375/670; 395/674, 395/677; 364/281.5, 230.3, 281.3

[56] References Cited

U.S. PATENT DOCUMENTS

| | | | |
|---|---|---|---|
| 4,189,771 | 2/1980 | Roever | 364/300 |
| 4,403,285 | 9/1983 | Kikuchi | 364/200 |
| 4,494,193 | 1/1985 | Brahm et al. | 364/200 |
| 4,791,554 | 12/1988 | Hirota et al. | 364/200 |
| 5,016,167 | 5/1991 | Nguyen et al. | 364/200 |
| 5,161,227 | 11/1992 | Dias et al. | 395/650 |
| 5,274,809 | 12/1993 | Iwasaki et al. | 395/650 |
| 5,285,528 | 2/1994 | Hart | 395/725 |
| 5,377,351 | 12/1994 | Kotera et al. | 395/650 |
| 5,440,743 | 8/1995 | Yokota et al. | 395/650 |
| 5,442,763 | 8/1995 | Bartfai et al. | 395/375 |

FOREIGN PATENT DOCUMENTS

| | | |
|---|---|---|
| 62-208139 | 9/1987 | Japan . |
| 63-52263 | 3/1988 | Japan . |
| 2-77868 | 3/1990 | Japan . |
| 2-77960 | 3/1990 | Japan . |

OTHER PUBLICATIONS

Computer, vol. 11, No. 11, Nov. 1989, Long Beach US, pp. 37–38, M. Singhal, "Deadlock detection in distributed systems.".

IBM Technical Disclosure Bulletin, vol. 16, No. 10, Mar. 1974, New York US, pp. 3471–3481, A. Chandra et al, "Communication protocol for deadlock detection in computer networks.".

*Primary Examiner*—Emanuel Todd Voeltz
*Assistant Examiner*—Michael T. Richey
*Attorney, Agent, or Firm*—Staas & Halsey

[57] ABSTRACT

Start, commit and abort of transactions in a computer system are managed by a task manager. When a certain transaction locks a certain resource, this information is registered in a lock manager. Accordingly, when a transaction requests for gaining a resource, the lock manager can determine that the resource is already locked, if any, by another transaction. In such a case, the transaction should wait for the termination of the other transaction, so that this information is registered in a wait-for-graph table. A deadlock detector determines whether the deadlock is caused according to the registered information in the wait-for-graph table.

15 Claims, 10 Drawing Sheets

DEADLOCK DETECTING DEVICE

This application is a continuation, of application Ser. No. 08/204,506, filed Mar. 2, 1994, now abandoned.

BACKGROUND OF THE INVENTION

1. Field of the Invention

This invention relates to a device for detecting deadlock in a multitasking system.

2. Description of the Related Art

In recent years, multitasking systems have been developed in which a plurality of tasks or transactions are executed at the same time as a mode of operation of an information processing system using computers. A task is one or more sequence of instructions treated as a unit of work to be accomplished by a central processing unit (CPU). A transaction is a set of operations to carry out one complete data operation. The multitasking is a state in which two or more programs (tasks, transactions) are executed simultaneously in parallel on a single computer system or on a plurality of computer systems connected in an interleaved manner allowing exchange of information therebetween.

In the operating systems that support this multitasking, two or more tasks may commonly use one computer resource. In such a case, each task may exclusively use portions of the resources that are necessary for the execution of the other task(s). As a result, the tasks are simultaneously waiting resources assigned to the other(s), with each one unable to carry out further processing. Such a situation is called deadlock. A term "lock" is commonly used as a technical term representing "use exclusively," so that a word "lock" is used hereinafter also as a verb in place of "use exclusively."

An example of a deadlock situation is shown in FIG. 10. FIG. 10 illustrates an example in a distribution system consisting of two computer systems i and j. One computer system i executes a task x and the other computer j executes a task y. In addition, it is assumed that two resources A and B can be accessed by the individual computer systems i and j. A resource includes software such as programs, files and data allocated to the tasks. The resource used herein is the contents (pages or records) of a database located somewhere other than the computer systems i and j.

In FIG. 10, the task x locks the resource A while the task y locks the resource B. At the same time, the task y asks for the resource A and awaits to lock the resource A. Likewise, the task x asks for the resource B and awaits to lock the resource B. In such a case, the task y cannot lock the resource A until the task x releases the lock on the resource A. Likewise, the task x cannot lock the resource B until the task y release the lock on the resource B. As a result, the tasks x and y are each awaiting the resources locked by the other. When both tasks x and y are suspended, it becomes impossible to release the resources A and B that are locked by them. Accordingly, this situation lasts endlessly and each task is thus unable to carry out further processing.

Such deadlock is a problem that could be caused in the multitasking systems regardless of whether the computer system is a multi-processing system or a single processing system and whether the computer system performs stand-alone processing or serves as a distribution system.

A way of recovering from deadlock, should be provided. To this end, the deadlocks should be detected.

To detect the deadlocks, the following specifications are required to be satisfied by the considerations of improving the practicability.

First, it is necessary to avoid detection of a phantom deadlock, i.e. an incorrect recognition, of a situation that is not the deadlock. (First requirement)

Second, all deadlocks should be detected. In other words, the deadlocks, if actually caused, should be detected as a deadlock and it is not permitted to detect the deadlock or not as a case may be. (Second requirement)

Third, any effects on the system due to detection of the deadlocks should be reduced as much as possible. More specifically, stopping the task for detection of the deadlock should be avoided, if possible. (Third requirement)

If the multitasking system is achieved on a distribution system, a following specification is required along with the above mentioned requirements. While systems are required to intercommunicate with each other to detect the deadlocks, an overhead time that the systems spend for the communication should be reduced as much as possible. (Fourth requirement)

Conventional deadlock detecting devices are based on detection of the deadlocks with satisfaction of the above mentioned first through third requirements by means of satisfying the following conditions. The conditions are:

(a) free from asynchronous abort of one of the two contending transactions; (b) free from delay and loss of communication messages between the systems when the multitasking system is achieved on the distribution system; (c) free from modification of a transaction waiting relation during detection of the deadlocks; and (d) free from an asynchronous down of the system when the multitasking system is achieved on the distribution system.

Described is a relation between the first through third requirements and conditions (a) through (d).

For condition (a), the asynchronous abort of the transactions makes it impossible to avoid detection of the phantom deadlock in the above mentioned first requirement. For example, it is assumed that task (transaction) x locks resource A while task (transaction) y locks resource B and that task y is asynchronously aborted when task y asks for resource A and task x asks for the resource B. In such a case, resource B locked by task y is released as a result of the asynchronous aborting of task y and thus task x is allowed to lock on resource B. Accordingly, the deadlock is avoided. It is, however, impossible to detect immediately this release of resource B due to the asynchronous aborting of the task. This makes the situation be considered as the deadlock though no deadlock is caused actually.

For condition (b), asynchronous down of the system sometimes allows detection of the deadlock and sometimes not. Accordingly, it is impossible to detect all deadlocks as required in the above mentioned second requirement. This is because even the occurrence of the deadlock becomes uncertain when transmission of a communication message is delayed or the message is lost due to abnormal communication, since in the distribution system each computer system is allowed to access a common resource through the intercommunication of the systems.

Likewise, for condition (d), delay or loss of a communication message between systems sometimes allows detection of deadlock and sometimes not. Accordingly, it is impossible to detect all deadlocks as required in the above mentioned second requirement. This is because management information on the tasks in the system is lost and it becomes impossible to determine the deadlock when one system is downed during operation of the other system.

For condition (c), the first or the second requirement cannot be satisfied when the transaction waiting relation is changed during detection of the deadlocks because information regarding which task locks which resource is lost.

However, to satisfy condition (c) means to forbid causing of any fresh transactions (tasks) or causing of waiting relation during detection of the deadlocks. In other words, acceptance of any request in the system should be suspended temporarily to detect the deadlocks. Accordingly, if a task issues a request for a resource (z) that has no relation with the deadlock, the request should be suspended. As a result, pursuit of the condition (c) inhibits a smooth and effective operation of the system and the third requirement will not be satisfied.

It is impossible in practice to avoid detection of the phantom deadlocks concerning with the condition (a). In other words, it is impossible to predict and avoid abnormal states that could be caused in individual systems and thus the asynchronous abort of the task cannot be avoided.

SUMMARY OF THE INVENTION

Accordingly, an object of the present invention is to reduce effects on a system due to detection of deadlocks by means of continuing detection of the deadlock even when a transaction waiting relation is changed during detection of the deadlock. In a distribution system, an object is to detect all deadlocks without detecting a phantom deadlock, reduce an overhead time in communication as much as possible, and reduce effects on the system due to detection of the deadlocks. Detection continues even when delay or loss of communication message between systems are caused, when a transaction waiting relation is changed during detection of the deadlock and when an asynchronous down of the system is caused.

To achieve these objects, the present invention is provided with a deadlock detecting device for detecting, in a multitasking system where a plurality of tasks use a common resource, deadlocks in which tasks are each awaiting resources locked by the other(s) and unable to carry out further processing. The deadlock detecting device comprises a task manager for managing execution of the tasks to ensure parallel execution of two or more tasks; a lock manager for managing which resource is locked by the task; a waiting relation registering unit for registering, when one task asks for a resource locked by the other task, a "waiting relation" indicating that one task is awaiting for the other task; and a deadlock detector for detecting the deadlocks based on this "waiting relation" registered in the waiting relation registering unit. The deadlock detector is operated in asynchronism with the lock manager.

BRIEF DESCRIPTION OF THE DRAWING

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT

First Embodiment

Figure 1:
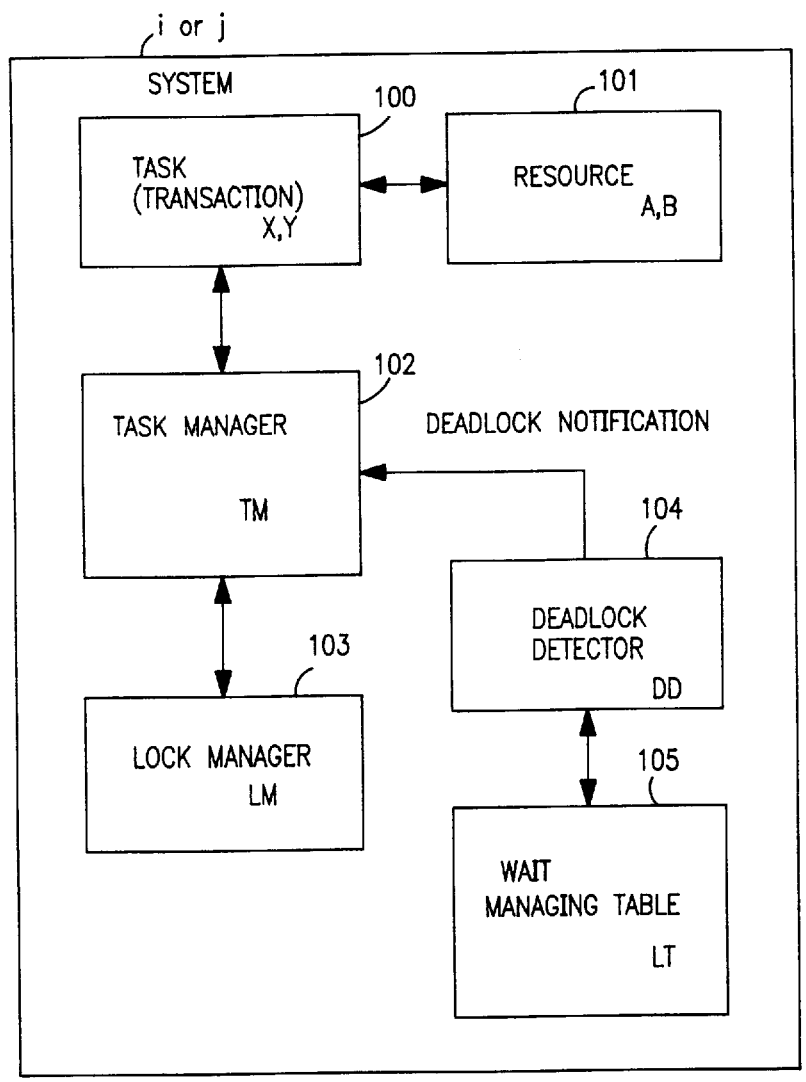
FIG. 1 is a block diagram illustrating a first embodiment of the present invention.

A first embodiment of the present invention is shown in FIG. 1. A deadlock detecting device according to the first embodiment detects deadlocks caused in a multitasking system in which a plurality of tasks 100 use a common resource 101.

A typical multitasking system comprises a task manager (TM) and a lock manager (LM) 102. The task manager (TM) 102 manages execution status of the tasks (x, y) 100 to execute a plurality of tasks (x, y) 100 in parallel. The lock manager (LM) 103 detects and manages information regarding which task 100 is locking which resource 101 or waiting to lock which task 100.

In this embodiment, such a multitasking system is provided with a wait managing table (LT) 105 and a deadlock detector (DD) 104. The wait managing table (LT) 105 registers a "waiting relation" concerning the task. The deadlock detector (DD) 104 detects the deadlocks based on the "waiting relations" registered in this managing table (LT) 105.

A "task" usually means one or more sequence of instructions treated as a unit of work to be accomplished by a central processing unit (CPU). In this invention, the word "task" can also be referred to as a "transaction." The "transaction" means a set of operations for a complete data operation and is a concept involved in the "task," which is executed by programs. The present invention is directed to detect the lock situation in which each program commonly uses the resource when a plurality of programs are executed in parallel at the same time. Thus, a difference in words has no significant meaning in the present invention even if any one of the terms "task," "transaction," and an execution unit to be accomplished by the programs is used. The "task" is used hereinafter as an equivalence to the "transaction," which makes no matter in executing the present invention. In the present invention, the resource 101 commonly used by the tasks 100 maybe files (a collection of data), records stored in the files, and so on. The lock used in this invention means that a task or a transaction exclusively use the entire file or exclusively uses a record in the file.

In the present embodiment, the deadlocks are detected in the following manner. A lock relation between the task (transaction) 100 and the resource 101, i.e., a "waiting relation" is registered in the above mentioned wait managing table (LT) 105. The deadlock detector (DD) 104 looks up the wait managing table (LT) 105 to detect the deadlock. This detection is made independently of the task management made by the above mentioned lock manager (LM) 103. Preferably, the deadlock detector (DD) 104 is required to register the "waiting relation" in the wait managing table (LT) 105 when the above mentioned lock manager (LM) 103 detects that "a certain task is in the "waiting relation" for a certain resource." The presence or absence of the deadlock is determined by means of looking up the registered contents therein.

A following method may be advantageously used as a method of registering the waiting relation of the transaction in the wait managing table (LT) 105 and for detecting the deadlock. That is, the waiting relation of the transaction is expressed by a graph. This graph is referred herein to as a wait-for-graph (WFG). This graph is registered in the above mentioned wait managing table (LT) 105.

In this graph, the transaction x caused in the system i is defined as T(i, x) while the transaction y caused in the system j is defined as T(j, y). In addition, waiting of T(i, x) for T(j, y), i.e., waiting of T(i, x) for release of the resource 101 locked by T(j, y) is represented herein by:

$$T(i, x) \rightarrow T(j, y).$$

In this event, T(i, x) is unable to proceed with further operation until T(j, y) is terminated.
When $$T(i, x) \rightarrow T(j, y)$$

and $$T(j, y) \rightarrow T(i, x)$$

are held at the same time, a loop of $$T(i, x) \rightarrow T(j, y) \rightarrow T(i, x)$$

is formed. This case corresponds to the deadlock situation, so that detection of this loop allows detection of the deadlock.

The above description is for the detection of the deadlock between two systems. The deadlock in the own system is represented by:

$$T(i, x) \rightarrow T(i, y) \rightarrow T(i, x).$$

A feature of this embodiment lies in a point that the deadlock detector (DD) 104 is provided in the systems (i, j) independently of a block such as the task manager (TM) 102 or the lock manager (LM) 103 required for executing the tasks to be operated in asynchronism with the task manager (TM) 102 and the lock manager (LM) 103.

In a conventional deadlock detecting method, execution of the individual tasks 101 is temporarily stopped to detect the deadlock, during which the presence or absence of the deadlock is determined according to lock information in the lock manager (LM) 103. It is, however, impossible to ensure a smooth operation of the tasks 100.

On the contrary, in the present embodiment the wait managing table (LT) 105 is provided independently of the task manager (TM) 102 and the lock manager (LM) 103, and the lock information, i.e. a "lock relation" or "waiting relation" produced by the above mentioned lock manager (LM) 103 is registered in the wait managing table (LT) 105. In addition, the deadlock detector (DD) 104 which operates independently of the execution of the tasks 100 is provided. The deadlock detector (DD) 104 determines the presence or absence of the deadlock according to the registered contents in the above mentioned wait managing table (LT) 105 in consideration of the waiting relation of the task when the lock manager (LM) 103 receives information indicating that the task 100 comes to a situation for waiting the resource 101.

As mentioned above, in the present embodiment, the deadlock detector (DD) 104 is provided independently of the system such as the task manager (TM) 102 and the lock manager (LM) 103 (required for executing the task 100). The deadlock detector (DD) 104 is operated independently, so that it is not necessary to suspend the execution of the task 100 for the deadlock detection.

Detection of the deadlocks by the deadlock detector (DD) 104 is preferably made when the waiting relation of the task 100 is detected by the above mentioned lock manager (LM) 103. More specifically, the deadlock detector (DD) 104 registers the waiting relation in the managing table (LT) 105 when the lock manager (LM) 103 detects the waiting relation of the task 100. This registration is used as a starting trigger for the deadlock detection. The deadlock detector (DD) 104 detects the presence or absence of the deadlock by means of looking up the wait managing table (LT) 105 in response to reception of the registration notification.

To register the above mentioned "waiting relation" in the above mentioned wait managing table (LT) 105, it is enough to register the "waiting relation of each task 100 in the wait managing table (LT) 105 provided in a system when two or more tasks (x, y) 100 are present in the same system.

On the other hand, if the task 100 in one system is in the "waiting" state for the task in the other system, this "waiting relation" is notified from one system to the wait managing table (LT) 105 of the other system. The wait managing table (LT) 105 registers this "waiting relation" in response to this notification. At the same time as this registration, the deadlock detector (DD) 104 of the other system looks up the wait managing table (LT) 105 to determine the presence or absence of the deadlock. It is also possible to notify the wait managing table (LT) 105 of one system from the other system of this "waiting relation" to determine the presence or absence of the deadlock by means of looking up this wait managing table (LT) 105.

The above mentioned description is for a case where the "waiting relation" of the task 100 in the own system and the "waiting relation" of the task 100 in the waited system are both registered in the wait managing table (LT) 105 of the own system. On the contrary, only the "waiting relation" of the own system may be registered in the own managing table (LT) 105. In such a case, the wait managing table (LT) 105 of the waited system is accessed through communication to detect the deadlock. The "waiting relation" of the task 100 in the own system is compared with the "waiting relation" of the task 100 in the waited system. If the above mentioned loop is formed, this is detected as the deadlock.

According to this embodiment, communication of the information among two or more systems for detecting the deadlock is not made to detect the deadlock in the own system. The communication of the information is made only when the deadlock is caused among two or more systems. In most cases, the deadlock is caused between two systems, so that the deadlock can be detected through one communication.

In this embodiment, the deadlock detector (DD) 104 is independent of and separated from the task manager (TM) 102 and lock manager (LM) 103, and thus the detection of the deadlocks will never affect the execution of the tasks 100.

When the deadlock is detected, it is necessary for restoring from the deadlock to forcibly abort either task 100. The systems are used to determine which task is forcedly aborted. For example, the task 100 starting time of which is later than the others is considered to have less amount of work and this task 100 is aborted. Alternatively, the amount of work may be calculated actually to abort the task 100 having the less amount of work.

Second Embodiment

Figure 2:
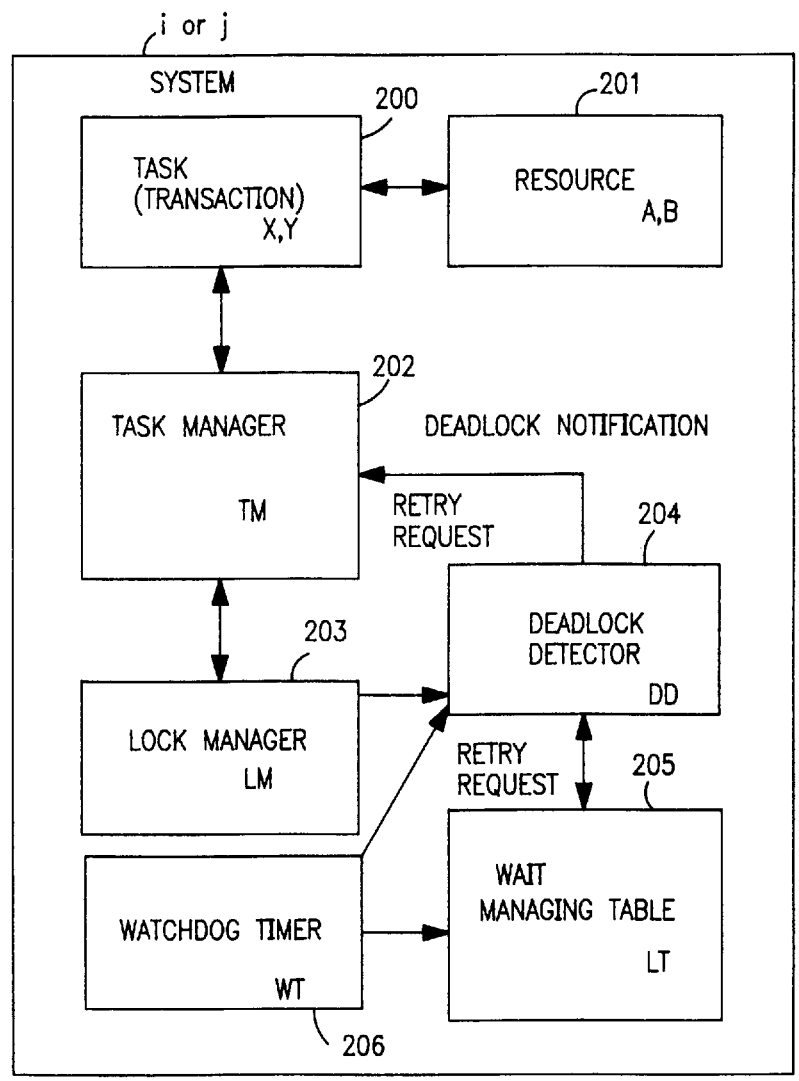
FIG. 2 is a block diagram illustrating a second embodiment of the present invention.

A second embodiment of the present invention is shown in FIG. 2. A deadlock detecting device according to the second embodiment detects the deadlocks caused in the multitasking system in which a plurality of tasks 200 use a common resource 201. This second embodiment is characterized by comprising a watchdog timer (WT) 206 along with the components described in the first embodiment. The watchdog timer (WT) 206 is a block for issuing a resource 201 gaining request again for the task (transaction) 200 in the "waiting relation" for a given period of time. The watchdog timer (WT) 206 is provided for following reasons.

It is impossible to restore from the deadlock when the deadlock, even if caused, is not detected. The reason why the deadlock that is actually caused cannot be detected may be that information of the "waiting relation" is not registered in the managing table (LT) 205 due to loss of communication. With this respect, the watchdog timer (WT) 206 issues the resource gaining request again when the "waiting relation" is continued for a certain period of time for the task 200. As a result, there is a chance of transmitting again the information of the "waiting relation" to the wait managing table (LT) 205 in the waited system, and thus the deadlock can be detected positively.

Third Embodiment

Figure 3:
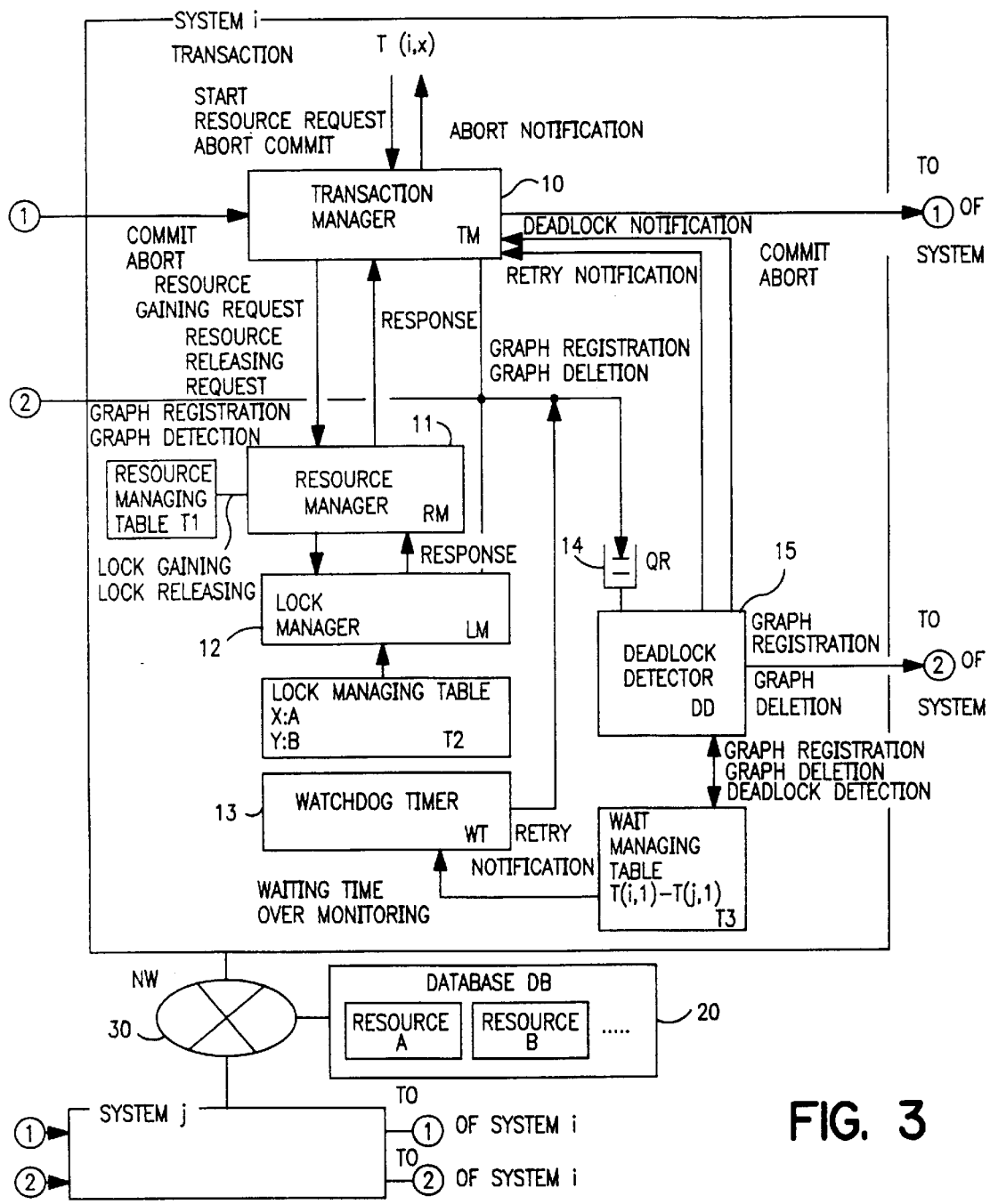
FIG. 3 is a block diagram illustrating a third embodiment of the present invention.

FIG. 3 shows a third embodiment of the present invention.

In this embodiment, the word "transaction" is used rather than the "task" that is used above. This third embodiment is a specific example of a case where the present invention is carried out in a distribution system.

<General Structure of the System>

FIG. 3 shows structure of a distribution system. In this distribution system, two computer systems (system i and system j) are provided in a distributed manner and are connected to each other through a network (NW) 30. In addition, a database (DB) 20 is connected to the computer systems i, j through the network (NW) 30. The computer systems are allowed access to the database (DB) 20. Such a system is applicable to, for example, an account system of a bank.

As apparent from FIG. 3, each computer system (system i, j) comprises a transaction manager (TM) 10, a resource manager (RM) 11, the lock manager (LM) 12, the deadlock detector (DD) 15, a wait-for-graph table T3, and the watchdog timer (WT) 13. The system j is equal in structure to the system i. Accordingly, FIG. 3 shows details for only the system i and illustration of the detailed structure of the system j is omitted.

The database (DB) 20 stores a plurality of files or records as the resource. In FIG. 3, the resources A and B are provided as the resource.

Each component block is described in detail.

<Transaction Manager (TM)>

The transaction manager (TM) 10 manages execution of two or more transactions. The transaction manager (TM) 10 can be referred to as the task manager (TM).

The transaction manager (TM) 10 is a block that receives communication indicative of start, commit, abort of the transaction from an application program to manage the transactions in the system. More specifically, when the transaction x is started in the system i, the data in the form of T(i, x) is registered while this data in the form of T(i, x) is deleted when the transaction x is terminated or aborted.

The transaction manager (TM) 10 passes, in response to acceptance of a request for the resource from the transaction, the request to the resource manager (RM) 11 and receives a response (OK/NO) thereof. The transaction manager (TM) 10 also accepts a deadlock notification transmitted from the deadlock detector (DD) 15 to abort the transaction. In addition, the transaction manager (TM) 10 accepts a retry notification transmitted from the deadlock detector (DD) 15 to reissue a resource gaining request to the resource manager (RM) 11. The transaction manager (TM) 10 receives communication indicative of the commit or the abort of the transaction in the other computer system (system j). In response to this, the transaction manager (TM) 10 requests the deadlock detector (DD) 15 to register or delete the wait-for-graph.

In FIG. 3, "start" means to start execution of the transaction while "abort" means to abort the transaction. "Commit" means to commit the transaction.

The resource gaining request and a resource releasing request in the transaction manager (TM) 10 is executed in a two-phase lock (2PL) system. This system is effective by the consideration of avoiding detection of the phantom deadlocks.

The phantom deadlock is typically caused when the registration and the deletion of the graph are competed with each other. For example, when a graph of $$T(i, x) \rightarrow T(j, y)$$

is already registered, it is assumed that a request for deleting $$T(i, x) \rightarrow T(j, y)$$

and a request for registering $$T(j, y) \rightarrow T(i, x)$$

are generated at the same time to the deadlock detector (DD) 15. In such a case, no deadlock is caused when the request for deletion is accepted first. On the contrary, the phantom deadlock is caused when the request for registration is accepted first. The request for deleting $$T(i, x) \rightarrow T(j, y)$$

is generated when the waiting relation expressed by this graph is given up (i.e., when T(j, y) releases the lock on the resource). Release of the lock is made either when the transaction itself releases the lock on the own resource or when the transaction is aborted asynchronously.

Two-phase locking protocol is a locking protocol consisting of two phases; when data once locked by the transaction goes on being locked and that once unlocked goes on being unlocked. According to this protocol, the same result can be obtained as a plurality of tasks or transactions that are serially executed. Also according to this system, the same result is provided as if the tasks or transactions are executed sequentially.

If the transaction is assumed not to be aborted asynchronously, this system ensures that no additional request for lock gaining will be generated once the lock is released. In other words, the graph $$T(i, x) \rightarrow T(j, y)$$

once generated is not deleted until T(j, y) is terminated. Accordingly, when the request for deletion of $$T(i, x) \rightarrow T(j, y)$$

is generated, T(j, y) has already been terminated and thus no additional request for gaining the resource is made by T(j, y). Thus, it is possible to ensure that a request for registering $$T(j, y) \rightarrow T(i, x)$$

is not generated.

For the above mentioned reasons, it is possible to restrict the cause of the phantom deadlock to the asynchronous abort of the transaction by means of applying this system.

<Resource Manager (RM)>

The resource manager (RM) 11 is connected to the transaction manager (TM) 10 in a two-way manner. The resource manager (RM) 11 comprises a resource managing table T1. The resource manager (RM) 11 maps and manages on the resource managing table T1 a corresponding relation between the transaction and the resource requested by the transaction according to the contents of the resource gaining request and the resource releasing request supplied from the transaction manager (TM) 10.

The resource manager (RM) 11 issues a lock request to the lock manager (LM) 12 in response to the resource gaining request supplied from the transaction manager (TM) 10. The resource manager (RM) 11 issues a lock releasing request to the lock manager (LM) 12 in response to the resource releasing request supplied from the transaction manager (TM) 10.

<Lock Manager (LM)>

The lock manager (LM) 12 is connected to the resource manager (RM) 11 in a two-way manner. The lock manager (LM) 12 comprises a lock managing table T2. The lock manager (LM) 12 is a control unit for controlling the lock conditions using the lock managing table T2.

In a case where the transactions x, y and the resources A, B are provided and when the transaction x locks the resource A while the transaction y locks the resource B, the lock manager (LM) 12 registers this relation in the lock managing table T2. More specifically, as shown in FIG. 3, a situation where x locks A is defined as, for example, (x:A) while a situation where y locks B is defined as (y:B). The lock manager (LM) 12 registers this information in the lock managing table T2. The lock managing table is used for managing lock information for the transactions in the other computer system (j or i) as well as for managing the lock information for the transactions in the own computer system (i or j). The lock information for the transactions in any other systems can be obtained through communication between the computer systems. Alternatively, necessity for the communication between the computer systems can be eliminated by means of creating a single lock managing table T2 on a common memory that is commonly used by the computer system (i, j) and managing generally the lock information for all transactions.

In the above mentioned situation, it is further assumed that the resource manager (RM) 11 issues a lock request for the resource A by the transaction y and a lock request for the resource B by the transaction x. Then, the lock manager (LM) 12 looks up the information in the lock managing table T2 to confirm that it is impossible to make such lock. In this case, the transaction y waits for the release of the lock on the resource A by the transaction x while the transaction x waits for the release of the lock on the resource B by the transaction y. These situations are defined as (x→B) and (y→A). When these definitions are generated, the lock manager (LM) 12 determines that "waiting" is caused. In this embodiment, such "waiting relation" is registered in and managed on a wait-for-graph table T3 independent of the lock manager (LM) 12. When the "waiting relation" is caused, the lock manager (LM) 12 request the deadlock detector (DD) 15 to register the graph according to the above mentioned definitions. Upon requesting this, the deadlock detector (DD) 15 is also supplied with information regarding the transaction (x, y) in the above definition, and the resources (A, B) in the above definitions are locked currently, by transaction, in the computer system.

The lock manager (LM) 12 immediately returns a response (OK) to the resource manager (RM) 11 when the lock request from the resource manager (RM) 11 is expected to be locked, that is, the request is not expected to be "waiting" for another transaction. A registration requesting queue is executed for registering the wait-for-graph indicative of the waiting relation in the wait-for-graph table T3 only when the "waiting" situation is caused, according to the determination by the lock manager (LM) 12. The execution processing of the transaction which requires gain of the resource is not stopped or suspended regardless of the detection or not of the deadlocks when the request is not expected to be "waiting" for another transaction.

<Deadlock Detector (DD)>

The deadlock detector (DD) 15 is a portion to determine the presence or absence of the deadlock according to the contents registered in the wait-for-graph table (T3).

The deadlock detector (DD) 15 comprises a request queue receiving unit (QR) 14. The request queue receiving unit (QR) 14 receives a wait-for-graph registration request queue and a wait-for-graph deletion request queue from the lock manager (LM) 12 in the own computer system i. In addition, the request queue receiving unit (QR) 14 receives the wait-for-graph registration request queue and the wait-for-graph deletion request queues from other computer systems i. Further, when the transaction in other system i is aborted or committed, the request queue receiving unit (QR) 14 receives a wait-for-graph deletion request queue from the transaction manager (TM) 10. The deadlock detector (DD) 15 registers or deletes the wait-for-graph first in or from the wait-for-graph table T3 according to these request queues. The format of this wait-for-graph is as follows. For example, the transaction x caused in the system i=T(i, x) and the transaction y caused in the system j=T(j, y), then waiting of T(i, x) for T(j, y) is represented by $$T(i, x) \rightarrow T(j, y).$$

To register the wait-for-graph, the deadlock detector (DD) 15 previously creates the wait-for-graph according to the information notified from the lock manager (LM) 12.

When the wait-for-graph is registered, the deadlock detector (DD) 15 starts detection of the deadlock. When the deadlock is detected, the deadlock detector (DD) 15 notifies the transaction manager (TM) 10 of the deadlock.

When a request for deleting the graph is received, the graph in question is deleted and the deadlock detector (DD) notifies the enable transaction of retry.

<Wait-for-Graph Table (T3)>

The wait-for-graph table T3 is provided with a wait-for-graph that is registered therein. As mentioned above, it is assumed that the transaction x caused in the system i=T(i, x) and the transaction y caused in the system j=T(j, y), then waiting of T(i, x) for T(j, y) is represented by $$T(i, x) \rightarrow T(j, y).$$

In such a case, the transaction x is not allowed to use the resource B, to be locked, until the transaction y updates the locking resource B to terminate T(j, y). This situation is referred to as the "waiting relation" in which "T(i, x) waits for T(j, y)." The deadlock detector (DD) 15 registers this graph of $$T(i, x) \rightarrow T(j, y)$$

in the wait-for-graph table T3 as the "waiting relation."

On the other hand, this graph of $$T(i, x) \rightarrow T(j, y)$$

may be held at the same time when $$T(j, y) \rightarrow T(i, x)$$

is held. In such a case, the transaction y is not allowed to use the resource A to be locked until the transaction x updates the resource A to terminate T(i, x). A loop of $$T(i, x) \rightarrow T(j, y) \rightarrow T(j, y) \rightarrow T(i, x)$$

is formed with these two waiting relations. Accordingly, detection of this loop corresponds to the situation where the deadlock is caused.

The waiting relation is caused between the transactions x of the systems i and the transaction y of the system j, respectively. The graph of $T(i, x) \rightarrow T(j, y)$ is registered in the wait-for-graph table T3 of the system i while the graph of $$T(j, y) \rightarrow T(i, x)$$

is registered in the wait-for-graph table T3 of the system j. Accordingly, either one of them should be transmitted to the other to compare them with each other. In this embodiment, when the "waiting relation" is registered, this "waiting relation" is transmitted to the waited system. That is, when $$T(i, x) \rightarrow T(j, y)$$

is registered in the wait-for-graph table T3 of the system i, the deadlock detector (DD) 15 of the system i transmits and registers the same contents to and in the wait-for-graph table T3 of system j.

As a result, it becomes possible to detect the deadlock in the waited system (i.e., the system j) by means of looking up the wait-for-graph table T3. When the "waiting relation" of the transaction is given up, the information regarding the "waiting relation" on the transaction x should be recovered (deleted) from the waited system (i.e., the system j), otherwise the deadlock is detected continuously. Accordingly, it is necessary to delete or recover the graph indicating the "waiting relation" from the wait-for-graph table T3 of the waited system (i.e., the system j) when the "waiting relation" is eliminated. The deadlock detector (DD) 15 also has a function of deleting and recovering the graph.

Detection of no graph of the wait-for-graph indicates that there is a possibility of the deadlock in the other system if the top end of the wait-for-graph is the transaction in the other system. Thus, the other system in question is required to register the graph. To accept a request of registering the graph issued by other systems, the deadlock detector (DD) 15 registers a necessary graph to detect the loop.

This waiting relation may be caused in the own system. For example, when a transaction x1=T(i, xl) caused in the system i waits for a transaction y1=T(i, yl) caused only in the own system (i.e., the system i), $$T(i, xl) \rightarrow T(i, yl)$$

is registered in the wait-for-graph table T3 of the own system (i.e., the system i). In this event, if $$T(i, yl) \rightarrow T(i, xl)$$

is registered in the wait-for-graph table T3 of the own system (i.e., the system i), a loop of $$T(i, xl) \rightarrow T(i, yl) \rightarrow T(i, yl) \rightarrow T(i, xl)$$

is formed, according to which the deadlock can be detected.

Figure 4:
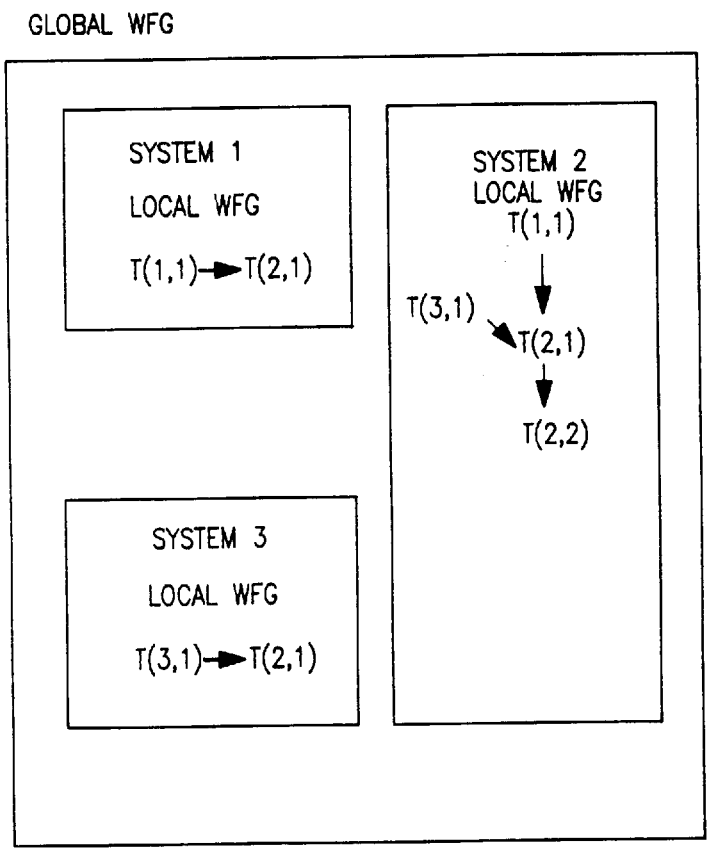
FIG. 4 is a view for use in describing a relation between a local wait-for-graph and a global wait-for-graph.

In the distribution system, the registered contents such as the wait-for-graph related to the transaction caused in a given system is referred to as a local wait-for-graph of that system. In addition, a graph representing the waiting relation in the entire distribution system, i.e., a set of all local wait-for-graphs in that distribution system is referred to as a global wait-for-graph. FIG. 4 is a view illustrating an exemplified relation between the local wait-for-graph and the global wait-for-graph.

In each computer system, only the local wait-for-graph is managed on the wait-for-graph table T3. In this embodiment, as mentioned above, the deadlock detector (DD) 15 does not transmit to other computer systems the registered contents such as the graph indicating the waiting relation between the transactions in the own computer system. On the other hand, the deadlock detector (DD) 15 transmits the graph indicating the waiting relation between the transaction in the other computer system and the transaction in the own computer system only to the associated system. Considering that statistically 90% or more of the deadlocks are caused between two tasks, the deadlock involved in the transaction in the other system could be detected with one communication. In addition, the deadlock caused only in the own computer system can be detected without communication. Accordingly, it becomes possible to reduce the overhead time required for the communication to detect the deadlocks.

<Watchdog Timer>

The watchdog timer (WT) 13 is a timer for use in monitoring the wait-for-graph table T3. This timer 13 monitors the "waiting relation" registered in the wait-for-graph table T3. If the "waiting relation" is continued when a predetermined time has elapsed since the "waiting relation" had been registered, the watchdog timer (WT) 13 issues a retry notification to make the waiting transaction in the "waiting relation" reissue the resource gaining request. The retry notification is supplied to the request queue receiving unit (QR) 14. When the retry notification is supplied to the request queue receiving unit (QR) 14, the deadlock detector (DD) 15 sends the retry notification to the transaction manager (TM) 10. In response to this retry signal, the transaction manager (TM) 10 reissues the resource gaining request to the transaction in the waiting relation.

The deadlock that is actually caused may not be detected as a result of delay or loss of a communication message between the systems or the asynchronous down of the computer system. The watchdog timer (WT) 13 is for avoiding such trouble. More specifically, the computer i, j systems perform communication with each other in the distribution system, the graph indicative of the deadlock situation may be lost due to loss of communication message between the systems. This makes the detection of the deadlock impossible. To avoid this, the watchdog timer (WT) 13 is provided as a mechanism for monitoring the transactions in the waiting relation.

This timer 13 urges, as mentioned above, the transaction in the waiting relation of the wait-for-graph registered in the table T3 for a predetermined time or longer to reissue the resource gaining request through the deadlock detector (DD) 15. In response to this, the transaction manager (TM) 10 reissues the resource gaining request. If the "waiting" has given up already at that time, then the resource gaining request is accepted. On the other hand, if the waiting has not eliminated, the graph is again transmitted to the other computer system. This makes up for the loss of the graph and thus the deadlock can be detected.

<Exemplified Operation in each Component>

Operation in the above mentioned components is described in conjunction with the flow charts.

[Operation of the Transaction Manager (TM)]

Figure 5:
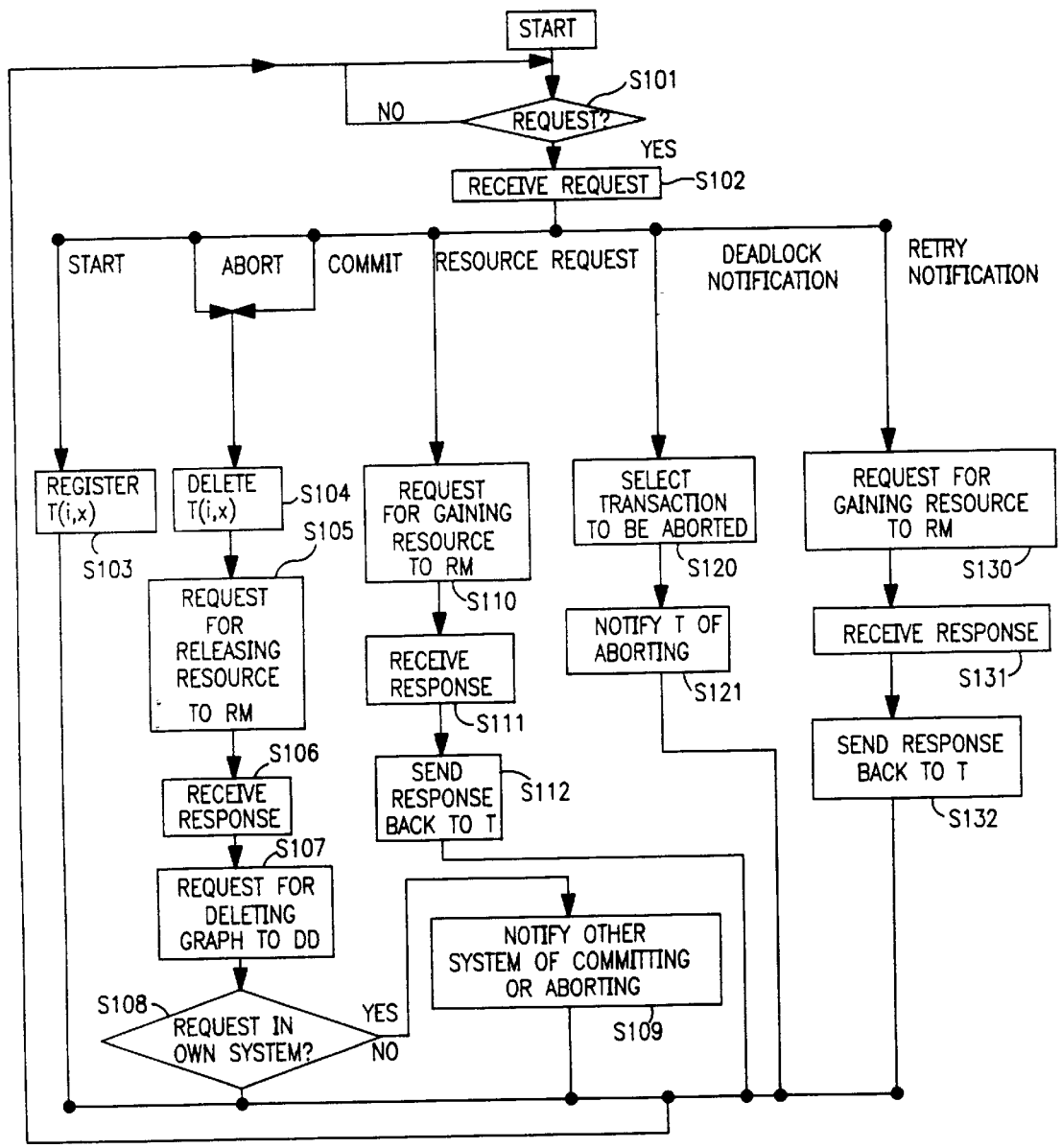
FIG. 5 is a flow chart illustrating operation of a transaction manager in FIG. 3.

As shown in the flow chart of FIG. 5, the transaction manager (TM) 11 waits for a request such as the start, the abort, the commit, the resource gaining request, the deadlock notification and the retry notification (Step 101). The abort and the commit used herein includes those notified from other computer systems. When any one of the request is received (Step 102), the transaction manager (TM) 10 allocates the processing according to the type of the request.

When the request received at the step 102 is start, this transaction (referred to as T(i, x) for convenience) is registered in the transaction manager (TM) 10 itself (Step 103) and the transaction manager 10 waits for a subsequent request.

When the request received at the step 102 is abort or commit, the transaction to be aborted or committed (referred to as T(i, x) for convenience) is deleted (Step 104). Next, the transaction manager (TM) 10 issues the resource releasing request to the resource manager (RM) 11 (Step 105). When a response to the resource releasing request is received from the resource manager (RM) 11(Step 106), the transaction manager (TM) 10 requests the deadlock detector (DD) 15 delete the graph (Step 107). Subsequently, the transaction manager (TM) 10 determines whether the request in question is from the own computer system (Step 108). When the request is transmitted from the other computer system, no operation is made for the time. On the contrary, if the request is from the own computer system, commit or abort is notified to the other computer system (Step 109). The computer system receiving the notification carries out processing at the steps 104 through 107.

When the request received at the step 102 is the resource gaining request, the transaction manager (TM) 10 supplies the resource gaining request to the resource manager (RM) 11 (Step 110). When a response to the request is received from the resource manager (RM) 11 (Step 111), the transaction manager (TM) 10 sends a response to the transaction (Step 112).

When the request received at the step 102 is the deadlock notification, the transaction manager (TM) 10 first selects the transaction to be aborted from the transactions in the deadlock situation (Step 120). More specifically, all transactions in the deadlock relation (referred herein to as T(i, x), T(j, y) for convenience) are specified in the deadlock notification. The transaction manager (TM) 10 thus selects the transaction to be aborted based on the names of the transactions included in the deadlock notification. Accordingly, the transaction manager (TM) 10 is allowed to specify the transaction in the other computer system as the transaction to be aborted. Subsequently, the transaction manager (TM) 10 notifies the selected transaction that the transaction is aborted (Step 121). If the selected transaction is in the other computer system, the transaction manager (TM) 10 notifies the selected transaction that the transaction is aborted through the transaction manager (TM) 10 of the other computer system.

When the request received at the step S102 is the retry notification, the transaction manager (TM) 10 first supplies the resource gaining request to the resource manager (RM) 11 (Step 130). When a response to this request is received from the resource manager (RM) 11 (Step 131), the transaction manager (TM) 10 sends a response back to the transaction (Step 131).

[Operation of the Resource Manager (RM)]

Figure 6:
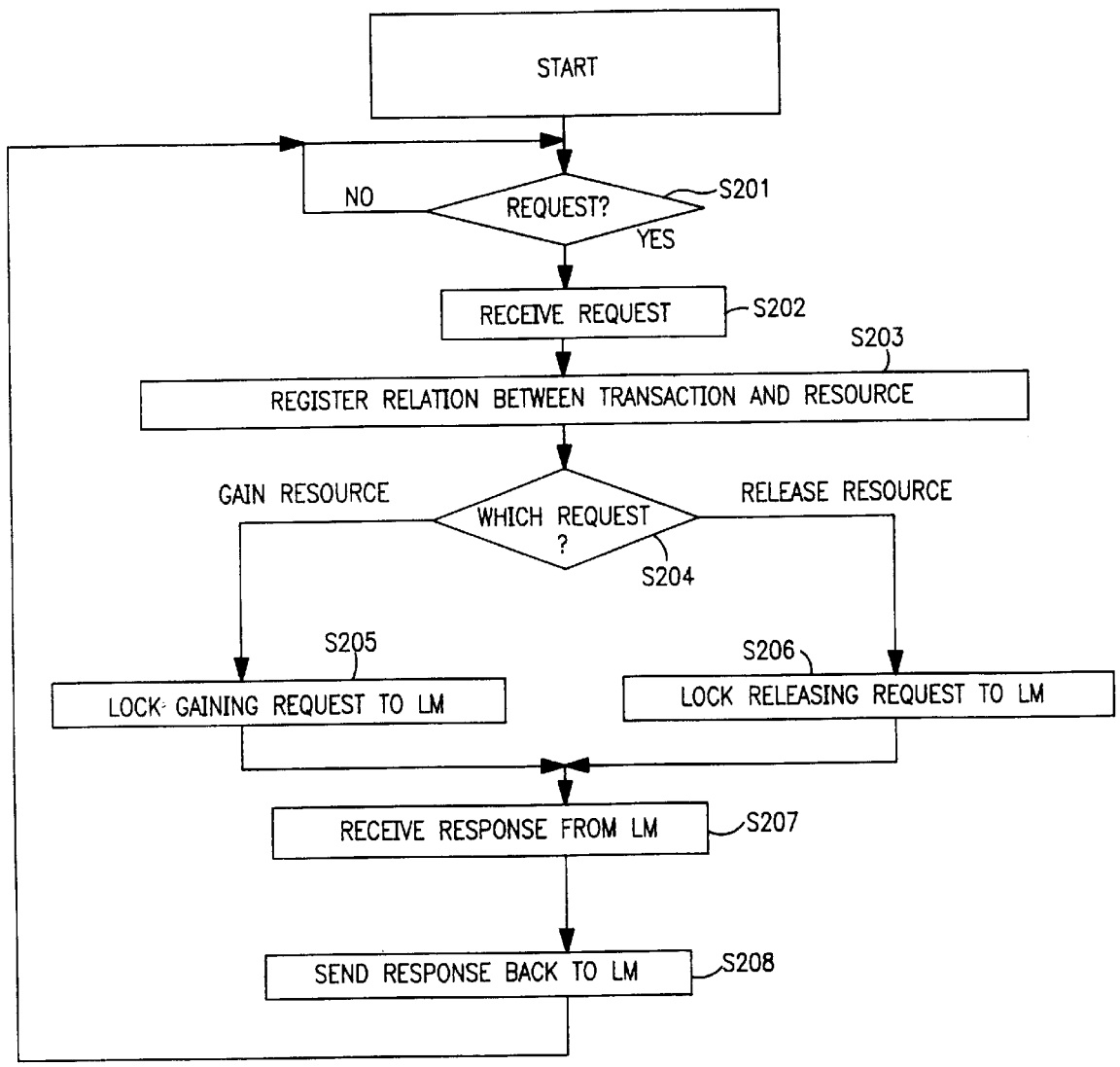
FIG. 6 is a flow chart illustrating operation of a resource manager in FIG. 3.

As apparent from the flow chart shown in FIG. 6, the resource manager (RM) 11 first waits for the resource gaining request and the resource releasing request (Step 201). When either one of the requests is made and received (step 202), the resource manager (RM) 11 attempts to lock the resource shown on the resource gaining table T1 and registers the relation in the resource gaining table T1 (Step 203). In other words, the resource manager (RM) 11 registers which transaction is trying to lock which resource.

Subsequently, the resource manager (RM) 11 determines whether the request is the resource gaining request or the resource releasing request (Step 204). When the request is the resource gaining request, the resource manager (RM) 11 supplies the lock gaining request to the lock manager (LM) 12 (Step 205). On the contrary, when the request is the resource releasing request, the resource manager (RM) 11 supplies the lock releasing request to the lock manager (LM) 12 (Step 206).

After receiving a response (OK/NO) to the lock gaining request or the lock releasing request from the lock manager (LM) 12 (Step 207), the resource manager (RM) 11 sends a response (OK/NO) back to the transaction manager (TM) 10 (Step 208).

[Operation of the Lock Manager (LM)]

Figure 7:
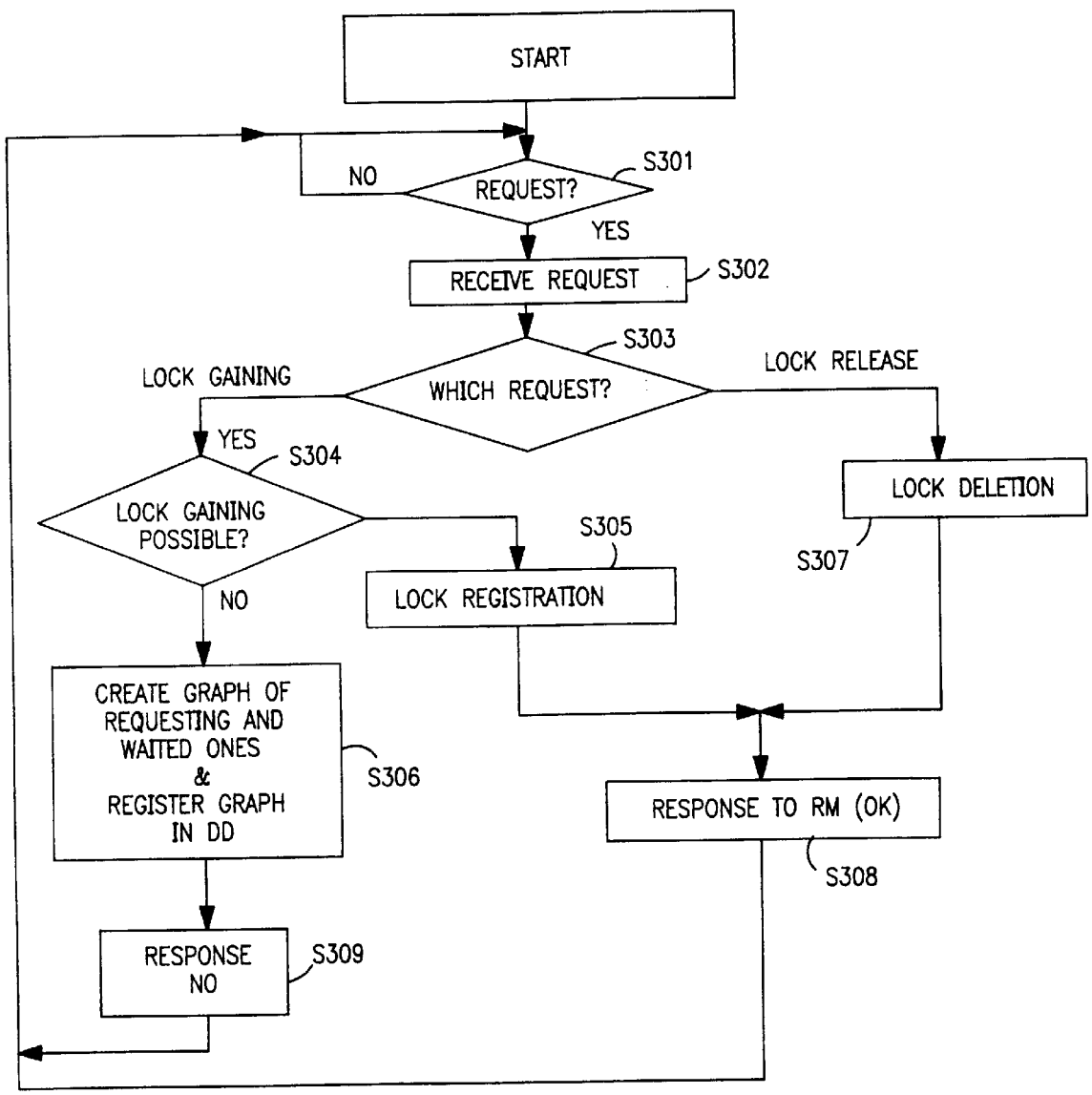
FIG. 7 is a flow chart illustrating operation of a lock manager in FIG. 3.

As apparent from the flow chart shown in FIG. 7, in response to the request at the step 205 or step 206 from the resource manager (RM) 11 (Step 301), the lock manager (LM) 12 receives the request (Step 302). Subsequently, the lock manager (LM) 12 determines whether the request is the lock gaining request or the lock releasing request (Step 303). When the request is the lock gaining request, the lock manager (LM) 12 determines whether it is possible to gain the lock (Step 304). If the lock on the resource is available, the lock manager (LM) 12 registers the lock situation in the lock managing table T2 (Step 305). On the contrary, if it is impossible to gain the lock on the resource indicating that there is the "waiting relation," the lock manager (LM) 12 requests the deadlock detector (DD) 15 to register the relation between the requesting transaction and the waiting transaction as a WFG graph in the wait-for-graph table T3 (Step 306). Subsequently, the lock manager (LM) 12 notifies the resource manager (RM) 11 that it fails to lock the resource (that is, "NO") (Step 309). If the request is determined as the resource releasing request at the step 303, then the lock manager (LM) 12 deletes the registration of the lock from the lock managing table T2 (Step 307). Then the lock manager (LM) 12 sends a response (that is, "OK") indicating completion of the registration or the deletion to the resource manager (RM) 11 (Step 308).

[Operation of the Deadlock Detector (DD)]

Figure 8:
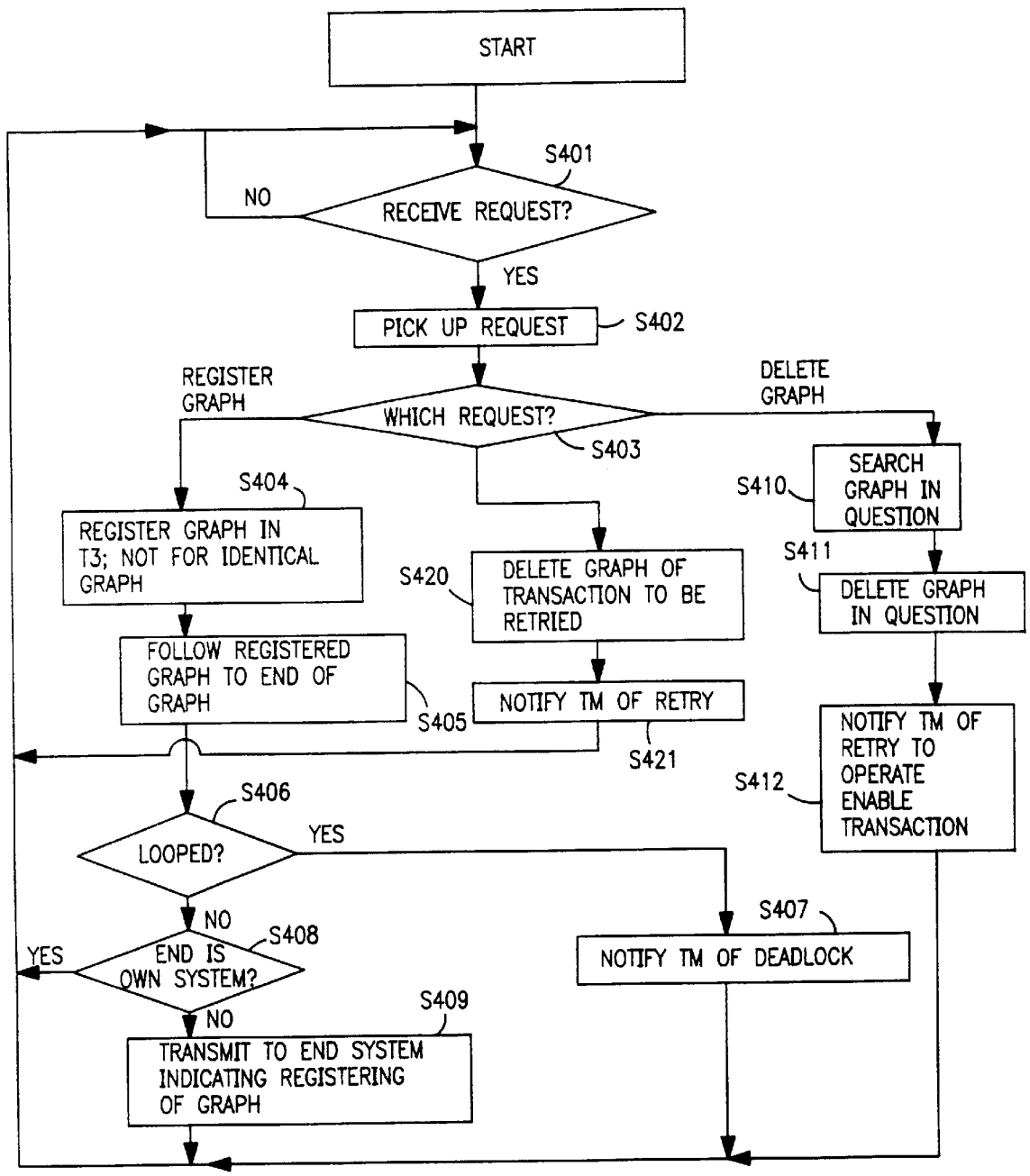
FIG. 8 is a flow chart illustrating operation of a deadlock detector in FIG. 3.

As apparent from the flow chart illustrated in FIG. 8, the deadlock detector (DD) 15 receives the graph registering request, the graph deleting request and the retry notification at the request queue receiving unit (QR) 14. Accordingly, in response to the request (step 401), the deadlock detector (DD) 15 picks up the request from the request queue receiving unit (QR) 14 (Step 402) to determine the type of the request (Step 403).

When the request is directed to the graph registration, the deadlock detector (DD) 15 first registers the wait-for-graph in the wait-for-graph table T3 (Step 404). If it is found, as a result of searching through the wait-for-graph table T3, that the same graph has already been registered therein, the deadlock detector (DD) 15 does not register the graph at that time. Next, the deadlock detector (DD) 15 follows the registered graph up to the top end thereof (Step 405). According to the result of the follow-up, the deadlock detector (DD) 15 determines whether a loop is formed (Step 406). If the loop is formed, the deadlock detector (DD) 15 notifies the transaction manager (TM) 10 of the deadlock (Step 407). If no loop is formed, the deadlock detector (DD) 15 determines whether the top end of the graph is a transaction in the own computer system (step 408). If the end is a transaction in the own computer system, then the control returns to the step 401. On the other hand, if the top end of the graph is a transaction in other computer system, the deadlock detector (DD) 15 sends the graph in question to the deadlock detector (DD) 15 of the other computer system to make it register the graph in the wait-for-graph table T3 of the other computer system (Step 409).

Next, when the request at the step 403 is directed to delete the graph, the deadlock detector (DD) 15 searches through the wait-for-graph table T3 to find the graph in question (Step 410). When the graph in question is found, the deadlock detector (DD) 15 deletes this graph (Step 411). Subsequently, the deadlock detector (DD) 15 supplies the retry notification to the transaction manager (TM) 10 to operate the transaction for which the waiting relation is eliminated (Step 412). When the request at the step 403 is the retry request, the deadlock detector (DD) 15 deletes the graph of the transaction to be retried (Step 420). Then, the deadlock detector (DD) 15 supplies the retry notification to the transaction manager (TM) 10 (Step 421).

[Operation of the Watchdog Timer (WT)]

Figure 9:
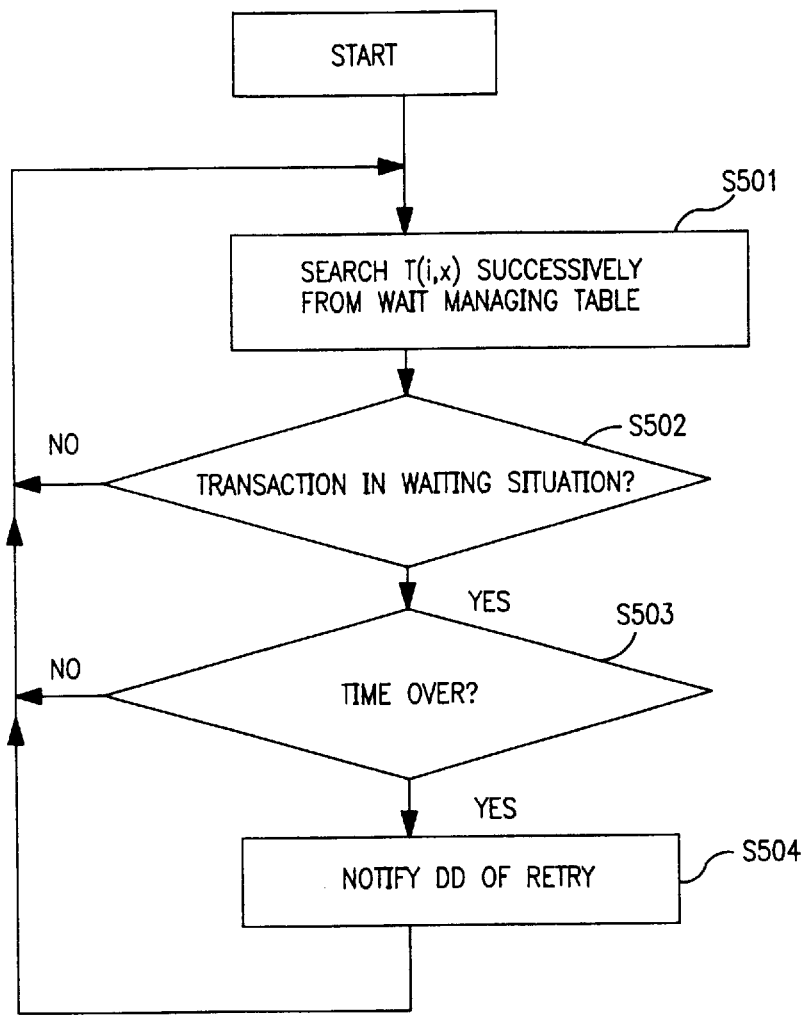
FIG. 9 is a flow chart illustrating operation of a watchdog timer in FIG. 3.
Figure 10:
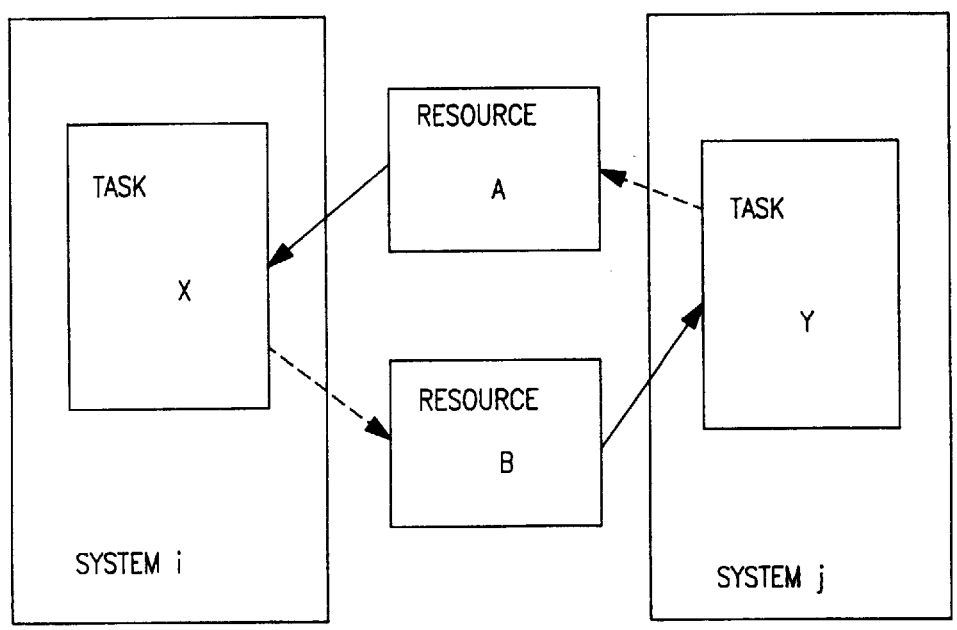
FIG. 10 is a view for use in describing a deadlock situation.

As apparent from the flow chart illustrated in FIG. 9, the watchdog timer (WT) 13 successively searches the transactions (such as T(i, x)) registered in the wait-for-graph table T3 (Step 501). Subsequently, the watchdog timer (WT) 13 determines whether the transaction x is in the "waiting relation" (Step 502). If the searched transaction is not in the "waiting relation," the step 501 is again executed. On the other hand, if the searched transaction is in the "waiting relation," the watchdog timer (WT) 13 starts to count the time. When a predetermined time is elapsed (Step 503), the watchdog timer (WT) 13 supplies the retry notification to the deadlock detector (DD) 15 (Step 504). When the "waiting relation" is eliminated at the step 503 before the predetermined time is elapsed, the step 501 is again executed (Step 502).

<Specific Examples of the Deadlock Detection>

Next, examples of the deadlock detection carried out by the above mentioned components are described for a three different cases.

[Example 1 Detection of the Deadlock Between the Transactions Both of Which are in the Own Computer System]

An example 1 is an example of deadlock detection between transactions which are both in the own computer system. More specifically, the following operation is carried out. This example reveals that the communication is not established with the other computer system.

(1) First, it is assumed that transaction T(l, 1) notifies the transaction manager (TM) 10 of initiation of the transaction.
(2) The transaction manager (TM) 10 registers transaction T(1, 1).
(3) On the other hand, it is assumed that transaction T(1, 2) notifies the transaction manager (TM) 10 of initiation of the transaction.
(4) The transaction manager (TM) 10 registers transaction T(1, 2).
(5) It is assumed that transaction T(1, 1) asks for the resource A to the transaction manager (TM) 10.
(6) The transaction manager (TM) 10 then requests for gaining the resource A to the resource manager (RM) 11.
(7) The resource manager (RM) 11 requests for gaining the lock on the resource A to the lock manager (LM) 12.
(8) The lock manager (LM) 12 sends OK back to the resource manager (RM) 11 if the resource A is not locked.
(9) The resource manager (RM) 11 sends a response OK to the transaction manager (TM) 10.
(10) On the other hand, it is assumed that transaction T(1, 2) asks for the resource B to the transaction manager (TM) 10.
(11) The transaction manager (TM) 10 then requests for gaining the resource B to the resource manager (RM) 11.
(12) The resource manager (RM) 11 requests for gaining the lock on the resource B to the lock manager (LM) 12.
(13) The lock manager (LM) 12 sends OK back to the resource manager (RM) 11 if the resource B is not locked.
(14) The resource manager (RM) 11 sends a response OK to the transaction manager (TM) 10.
(15) At that time, it is assumed that transaction T(1, 1) asks for the resource B to the transaction manager (TM) 10.
(16) The transaction manager (TM) 10 then requests for gaining the resource B to the resource manager (RM) 11.
(17) The resource manager (RM) 11 requests for gaining the lock on the resource B to the lock manager (LM) 12.
(18) However, the resource B has already been locked by transaction T(1, 2), so that transaction T(1, 1) waits for transaction T(l, 2). Accordingly, the lock manager (LM) 12 requests the deadlock detector (DD) 15 for registering the graph $$T(1, 1) \rightarrow T(1, 2).$$

The deadlock detector (DD) 15 receive the request and registers the graph in the wait-for-graph table T3.
(19) On the other hand, it is assumed that transaction T(1, 2) asks for the resource A to the transaction manager (TM) 10.
(20) The transaction manager (TM) 10 then requests for gaining the resource A to the resource manager (RM) 11.
(21) The resource manager (RM) 11 requests for gaining the lock on the resource A to the lock manager (LM) 12.
(22) However, the resource A has already been locked by transaction T(1, 1), so that transaction T(1, 2) waits for transaction T(1, 1). Accordingly, the lock manager (LM) 12 requests the deadlock detector (DD) 15 for registering the graph $$T(1, 2) \rightarrow T(1, 1).$$

The deadlock detector (DD) 15 receives the request and registers the graph in the wait-for-graph table T3.
(23) The deadlock detector (DD) 15 detects the loop and notifies the transaction manager (TM) 10 of the presence of the deadlock.

[Example 2 Detection of the Deadlock Between Two Transactions each of which is in either of Two Computer Systems Respectively]

An example 2 involves in a case where the deadlock is caused between two computer systems (system 1 and system 2 ). This example reveals that the communication for the deadlock detection is made only at once.

(1) First, it is assumed that transaction T(1, 1) of the system 1 notifies the transaction manager (TM) 10 of the system 1 of initiation of the transaction.
(2) The transaction manager (TM) 10 of the system 1 registers transaction T(1, 1).
(3) It is assumed that transaction T(1, 1) asks for the resource A to the transaction manager (TM) 10 of the system 1.
(4) The transaction manager (TM) 10 of the system 1 then requests for gaining the resource A to the resource manager (RM) 11.
(5) The resource manager (RM) 11 of the system 1 requests for gaining the lock on the resource A to the lock manager (LM) 12.
(6) The lock manager (LM) 12 of the system 1 sends OK back to the resource manager (RM) 11 if the resource A is not locked.

(7) The resource manager (RM) 11 of the system 1 sends a response OK to the transaction manager (TM) 10.
(1)' On the other hand, it is assumed that transaction T(2, 1) of the system 2 notifies the transaction manager (TM) 10 of the system 2 of initiation of the transaction.
(2)' The transaction manager (TM) 10 of the system 2 registers transaction T(2, 1).
(3)' It is assumed that transaction T(2, 1) asks for the resource B to the transaction manager (TM) 10 of the system 2.
(4)' The transaction manager (TM) 10 of the system 2 then requests for gaining the resource B to the resource manager (RM) 11.
(5)' The resource manager (RM) 11 of the system 2 requests for gaining the lock on the resource B to the lock manager (LM) 12.
(6)' The lock manager (LM) 12 of the system 2 sends OK back to the resource manager (RM) 11 if the resource B is not locked.
(7)' The resource manager (RM) 11 of the system 2 sends a response OK to the transaction manager (TM) 10.
(8) At that time, it is assumed that transaction T(1, 1) asks for the resource B to the transaction manager (TM) 10 of the system 1.
(9) The transaction manager (TM) 10 of the system 1 then requests for gaining the resource B to the resource manager (RM) 11.
(10) The resource manager (RM) 11 of the system 1 requests for gaining the lock on the resource B to the lock manager (LM) 12.
(11) However, the resource B has already been locked by transaction T(2, 1) of the system 2, so that transaction T(1, 1) waits for transaction T(2, 1). Accordingly, the lock manager (LM) 12 of the system 1 requests the deadlock detector (DD) 15 for registering the graph

T(1, 1)→T(2, 1).

(12) In response to this request, the deadlock detector (DD) 15 of the system 1 sends the graph

T(1, 1)→T(2, 1)

to the system 2. At the same time, the deadlock detector (DD) 15 of the system 1 registers the graph in the wait-for-graph table T3 of the system 1.
(13) The deadlock detector (DD) 15 of the system 2 receives the graph

T(1, 1)→T(2, 1)

and registers it in the wait-for-graph table T3 of the system 2.
(14) Subsequently, it is assumed that transaction T(2, 1) asks for the resource A to the transaction manager (TM) 10 of the system 2.
(15) The transaction manager (TM) 10 of the system 2 then requests for gaining the resource A to the resource manager (RM) 11.
(16) The resource manager (RM) 11 of the system 2 requests for gaining the lock on the resource A to the lock manager (LM) 12.
(17) However, the resource A has already been locked by transaction T(1, 1) of the system 1, so that transaction T(2, 1) waits for transaction T(1, 1). Accordingly, the lock manager (LM) 12 of the system 2 requests the deadlock detector (DD) 15 for registering the graph

T(2, 1)→T(1, 1).

(18) The deadlock detector (DD) 15 of the system 2 detects the loop and notifies the transaction manager (TM) 10 of the system 2 of the presence of the deadlock.

[Example 3 Message is Lost During Detection of the Deadlock Between Two Transactions Each of Which is in Either of Two Computer Systems Respectively]

An example 3 involves in a case where a massage is lost due to a communication error caused between two computer systems (system 1 and system 2).
(1) First, it is assumed that transaction T(1, 1) of the system 1 notifies the transaction manager (TM) 10 of the system 1 of initiation of the transaction.
(2) The transaction manager (TM) 10 of the system 1 registers transaction T (1, 1).
(3) It is assumed that transaction T(1, 1) asks for the resource A to the transaction manager (TM) 10 of the system 1.
(4) The transaction manager (TM) 10 of the system 1 then requests for gaining the resource A to the resource manager (RM) 11.
(5) The resource manager (RM) 11 of the system 1 requests for gaining the lock on the resource A to the lock manager (LM) 12.
(6) The lock manager (LM) 12 of the system 1 sends OK back to the resource manager (RM) 11 if the resource A is not locked.
(7) The resource manager (RM) 11 of the system 1 sends a response OK to the transaction manager (TM) 10.
(1)' On the other hand, it is assumed that transaction T(2, 1) of the system 2 notifies the transaction manager (TM) 10 of the system 2 of initiation of the transaction.
(2)' The transaction manager (TM) 10 of the system 2 registers transaction T (2, 1).
(3)' It is assumed that transaction T(2, 1) asks for the resource B to the transaction manager (TM) 10 of the system 2.
(4)' The transaction manager (TM) 10 of the system 2 then requests for gaining the resource B to the resource manager (RM) 11.
(5)' The resource manager (RM) 11 of the system 2 requests for gaining the lock on the resource B to the lock manager (LM) 12.
(6)' The lock manager (LM) 12 of the system 2 sends OK back to the resource manager (RM) 11 if the resource B is not locked.
(7)' The resource manager (RM) 11 of the system 2 sends a response OK to the transaction manager (TM) 10.
(8) At that time, it is assumed that transaction T(1, 1) asks for the resource B to the transaction manager (TM) 10 of the system 1.
(9) The transaction manager (TM) 10 of the system 1 then requests for gaining the resource B to the resource manager (RM) 11.
(10) The resource manager (RM) 11 of the system 1 requests for gaining the lock on the resource B to the lock manager (LM) 12.
(11) However, the resource B has already been locked by transaction T(2, 1) of the system 2, so that transaction T(1, 1) waits for transaction T(2, 1). Accordingly, the lock manager (LM) 12 of the system 1 requests the deadlock detector (DD) 15 for registering the graph

T(1, 1)→T(2, 1).

(12) In response to this request, the deadlock detector (DD) 15 of the system 1 registers the graph in the wait-for-graph table T3 of the system 1. At the same time, the deadlock detector (DD) 15 of the system 1 sends the graph

T(1, 1)→T(2, 1)

to the system 2.

(13) However, the transmitted content does not arrive to the system 2 because it is lost as a result of an communication error.

(14) Subsequently, it is assumed that transaction T(2, 1) asks for the resource A to the transaction manager (TM) 10 of the system 2.

(15) The transaction manager (TM) 10 of the system 2 then requests for gaining the resource A to the resource manager (RM) 11.

(16) The resource manager (RM) 11 of the system 2 requests for gaining the lock on the resource A to the lock manager (LM) 12.

(17) However, the resource A has already been locked by transaction T(1, 1) of the system 1, so that transaction T(2, 1) waits for transaction T(1, 1). Accordingly, the lock manager (LM) 12 of the system 2 requests the deadlock detector (DD) 15 for registering the graph

T(2, 1)→T(1, 1).

At that time, the deadlock situation is caused actually. However, the deadlock cannot be detected due to the loss of the message. Accordingly, the deadlock is continued.

(18) After a predetermined time, the watchdog timer (WT) 13 of the system 1 is operated to make a retry notification to the deadlock timer (DD) 15 of the system 1.

(19) The deadlock timer (DD) 15 of the system 1 then notifies the transaction manager (TM) 10 of the retry of transaction T(1,1).

(20) According to the retry notification, the transaction manager (TM) 10 of the system 1 requests the resource manager (RM) 11 for gaining the resource B.

(21) The resource manager (RM) 11 of the system 1 again requests for gaining the lock on the resource B to the lock manager (LM) 12.

(22) However, the resource B has already been locked by transaction T(2, 1) of the system 2, so that transaction T(1, 1) waits for transaction T(2, 1). Accordingly, the lock manager (LM) 12 of the system 1 again requests the deadlock detector (DD) 15 for registering the graph

T(1, 1)→T(2, 1).

(23) In response to this request, the deadlock detector (DD) 15 of the system 1 registers the graph in the wait-for-graph table T3 of the system 1. At the same time, the deadlock detector (DD) 15 of the system 1 again sends the graph

T(1, 1)→T(2, 1)

to the system 2.

(24) The deadlock detector (DD) 15 of the system 2 receives the graph

T(1, 1)→T(2, 1)

and registers it in the wait-for-graph table T3 of the system 2. As a result, the loss of the graph can be made up.

(25) The deadlock detector (DD) 15 of the system 2 detects the loop and notifies the transaction manager (TM) 10 of the system 2 of the presence of the deadlock.

As mentioned above, according to this embodiment, the lock manager (LM) 12 for managing the lock situation on the resource by the task (transaction) is separated from the deadlock detector (DD) 15 and they are operated in an asynchronous manner with each other. Accordingly, when the task (transaction) is generated additionally and requests the resource, it is allowed to be operated without passing through the deadlock detector (DD) if the lock can be obtained without waiting. This contributes to a smooth and effective operation of the system, increasing the processing speed. In addition, even when the lock cannot be obtained, the effect thereof is less significant because the registration of the lock situation (graph) and the detection of the deadlock are made in asynchronism with the request for the lock.

In particular, the effect of the deadlock detection on the system designed for reducing the deadlock becomes extremely insignificant.

When the present invention is applied to the distribution system, the system establishes communication for the deadlock only when it comes under the waiting relation with the other system. Accordingly, the communication is not established for the deadlock detection in the own system. Even when the other system is involved in the deadlock with the own system, the deadlock could be detected one communication because 90% or more of the deadlocks is caused between two systems. Accordingly, it becomes possible to reduce the overhead time required for the communication to detect the deadlocks, allowing an effective operation of the system.

In addition, if a waiting time monitoring unit (WT) 13 is provided with the present invention, the watchdog timer (WT) 13 give another chance to detect the deadlock even if the message is delayed or lost during communication of the message in the distribution system. Thus, all deadlocks can be detected positively.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A deadlock detecting device of a multitasking system, said device detecting deadlock between plurality of tasks executed in the multitasking system, comprising;

task managing means for managing parallel execution of plurality of the tasks;

lock managing means for detecting that one task locks a common resource, and for detecting that another task is waiting for the common resource locked by the former task and outputting waiting relation information indicating that the latter task is waiting for the former task;

a wait management table for storing a plural pieces of waiting relation information;

registering means for registering said waiting relation information in said wait management table, every time said lock managing means outputs said waiting relation information; and deadlock detecting means for detecting the deadlock between plurality of the tasks, of plural pieces of waiting relation involving the tasks which are respectively indicated by any one of the waiting relation information stored in the wait management table forms a loop relation, said deadlock detecting means functioning independently and asynchronously from said lock managing means and said task managing means;

whereby execution of said first task and said second task is not suspended during deadlock detection.

2. The deadlock detecting device as claimed in claim 1, wherein said registering means has a table in which said waiting relations are registered.

3. The deadlock detecting device as claimed in claim 2, wherein said deadlock detecting means registers the waiting relations in the table of said registering means and detects the presence or absence of deadlock by searching said table.

4. The deadlock detecting device as claimed in claim 2, wherein said deadlock detecting means comprises a request queue receiving unit for receiving a "waiting relation registering request" indicative of an instruction to detect the deadlock loop.

5. The deadlock detecting device as claimed in claim 2, wherein the deadlock detecting device is realized on a distribution system having a first and second system, wherein each system comprises said task managing means, said lock managing means, said wait management table and said deadlock detecting means.

6. The deadlock detecting device as claimed in claim 5, wherein said second waiting relation from said first system is communicated and registered in said wait management table of said second system, and the presence or absence of the deadlock loop is determined by looking up said wait management table in said second system.

7. The deadlock detecting device as claimed in claim 5, wherein a task x generated in a system i is defined as T(i, x), a task y generated in a system j is defined as T(j, y) and waiting of T(i, x) for T(j, y) is represented by T(i, x)→T(j, y), which is registered in said table as information of the third waiting relation to detect a loop of T(i, x)→T(j, y)→T(i, x) when both T(i, x)→T(j, y) and T(j, y)→T(i, x) hold, thereby detecting the deadlock loop.

8. The deadlock detecting device as claimed in claim 1, wherein the dead lock detecting device is realized on a distribution system having a plurality of systems and comprises a waiting time monitoring unit for use in reissuing a resource gaining request to the task of which waiting relation is continued for a predetermined time.

9. A deadlock detecting device as claimed in claim 1, wherein said task managing means manages the tasks through a two-phase lock system in which a lock is continuously made when the task starts to lock a data while the lock is continuously released when the task starts to release the lock.

10. The deadlock detecting device as claimed in claim 2, wherein said lock managing means registers the first waiting relation in said wait management table and issues a deadlock detecting instruction to the deadlock detecting means only when the first waiting relation is caused to be a resource gaining request, and wherein said lock managing means does not suspend the execution operation on the transaction for the resource gaining request accompanying an absence of a waiting relation.

11. A deadlock detecting device of a multitasking system, said device detecting deadlock between plurality of tasks executed in the multitasking system, comprising:

a task manager which manages parallel execution of plurality of the tasks;

a lock manager which makes one task a common resource, and which detects that another task is waiting for the common resource locked by the former task and consequently output waiting relation information indicating that the latter task is waiting for the former task;

a wait management table for storing the waiting relation information; and deadlock detector which detects the deadlock between plurality of the tasks if plural pieces of the waiting relation involving the tasks which are respectively indicated by any one of the waiting relation information stored in the wait management table forms a loop relation, said deadlock detector functioning independently and asynchronously from said lock manager and said task manager;

whereby execution of said first task and said second task is not suspended during the deadlock detection.

12. The deadlock detecting device as claimed in claim 11, wherein said task manager starts, commits and aborts the first and second tasks.

13. The deadlock detecting device as claimed in claim 11, wherein said lock manager includes a lock table for locking a corresponding relation between said first task and said first resource and between said second task and said second resource.

14. A deadlock detecting device of a distribution system having a plurality of systems, said device detecting deadlock between plurality of tasks each of which is executed in one of the systems and is usable common resources, each system comprising:

a task manager which manages parallel execution of plurality of the task executed in own system;

a lock manager which makes one task lock a common resource and which detects that another task is waiting for the common resource locked by the former task and consequently output waiting relation information indicating that the latter task is waiting for the former task;

means for sending only waiting relation information indicating that one task is waiting for any task executed in other system to this other system, said sending means further sending waiting relation information indicating that one task is waiting for another task involved in the sent waiting relation information;

a wait management table for storing the waiting relation information outputted by the lock manager of own system and the waiting relation information sent from the sending means of other system;

a deadlock detector which detects the deadlock between plurality of the tasks, if plural pieces of the waiting relation involving the tasks which are respectively indicated by any waiting relation information stored in the wait management table forms a loop relation, said deadlock detector functioning independently and asynchronously from said lock manager and said task manager;

whereby execution of said first task and said second task is not suspended during the deadlock detection.

15. A deadlock detecting device according to claim 14, further comprising:

a watchdog timer watch which monitors, for every waiting relation information, elapsed time since the waiting relation information stored in the wait management table and, when the elapsed time exceeds a predetermined time period, makes the deadlock detector erase the waiting relation information from the wait management table to make the waiting transaction involved in the waiting relation information run again.

* * * * *

UNITED STATES PATENT AND TRADEMARK OFFICE
CERTIFICATE OF CORRECTION

PATENT NO. : 5,845,117
DATED : December 1, 1998
INVENTOR(S) : Kazuhiko FUJITA

It is certified that error appears in the above-identified patent and that said Letters Patent is hereby corrected as shown below:

Cover page, [30] Foreign Application Priority Data, "March 19, 1993" should be --March 30, 1993--.

Signed and Sealed this

Thirteenth Day of July, 1999

Attest:

Q. TODD DICKINSON

Attesting Officer

Acting Commissioner of Patents and Trademarks